United States Patent [19]

Lynch

[11] Patent Number: 5,448,603
[45] Date of Patent: Sep. 5, 1995

[54] PRESSURE-SENSITIVE VARIABLE-RESISTANCE HYGROSCOPIC FLUID DETECTOR, AND METHOD

[75] Inventor: James E. Lynch, Elmira, N.Y.

[73] Assignee: Imaging & Sensing Technology Corporation, Horseheads, N.Y.

[21] Appl. No.: 146,935

[22] Filed: Nov. 1, 1993

[51] Int. Cl.[6] .................................... G21C 17/00
[52] U.S. Cl. ........................ 376/250; 376/247; 376/245; 376/246
[58] Field of Search ............. 376/250, 247, 245, 246; 73/861.66, 861.42

[56] References Cited

U.S. PATENT DOCUMENTS

| | | | |
|---|---|---|---|
| 4,043,890 | 8/1977 | Isaacs | 204/195 S |
| 4,112,417 | 9/1978 | Himeno | 340/605 |
| 4,342,988 | 8/1982 | Thompson et al. | 340/679 |
| 4,524,624 | 6/1985 | Di Nota et al. | 73/708 |
| 4,666,655 | 5/1987 | Puyal | 376/245 |
| 4,688,996 | 8/1987 | Alexion et al. | 417/50 |
| 4,735,100 | 4/1988 | Hajto | 73/861.66 |
| 4,788,867 | 12/1988 | Kishel | 73/72.2 |
| 4,948,492 | 8/1990 | Niedrach et al. | 204/435 |
| 5,192,414 | 3/1993 | Indig et al. | 204/400 |

FOREIGN PATENT DOCUMENTS

0367584A2  5/1990  European Pat. Off. ............ 376/250

Primary Examiner—Donald P. Walsh
Assistant Examiner—Meena Chelliah
Attorney, Agent, or Firm—Phillips, Lytle, Hitchcock, Blaine & Huber

[57] ABSTRACT

A fluid detector (20) has an enclosure (32) defining an internal chamber (33). The enclosure has a frangible wall portion (34). A sensor (46) is arranged within the chamber. The sensor has a hygroscopic portion (48), the electrical resistance of which changes depending upon whether the sensor portion is wet or dry. The chamber is normally filled with a dry fluid, such as nitrogen. The outer surface of the enclosure is exposed to another fluid containing water. When the pressure differential across the frangible wall portion exceeds a predetermined minimum value, the frangible wall portion ruptures to permit the sensor portion to become wetted. An ammeter (31) is arranged to determine the change in the electrical resistance of the sensor and to indicate the presence of the water-containing fluid within the chamber. The detector is particularly useful in determining the fluid-tight sealed integrity of a closed-end thimble having a portion inserted into a pressurized water reactor.

15 Claims, 2 Drawing Sheets

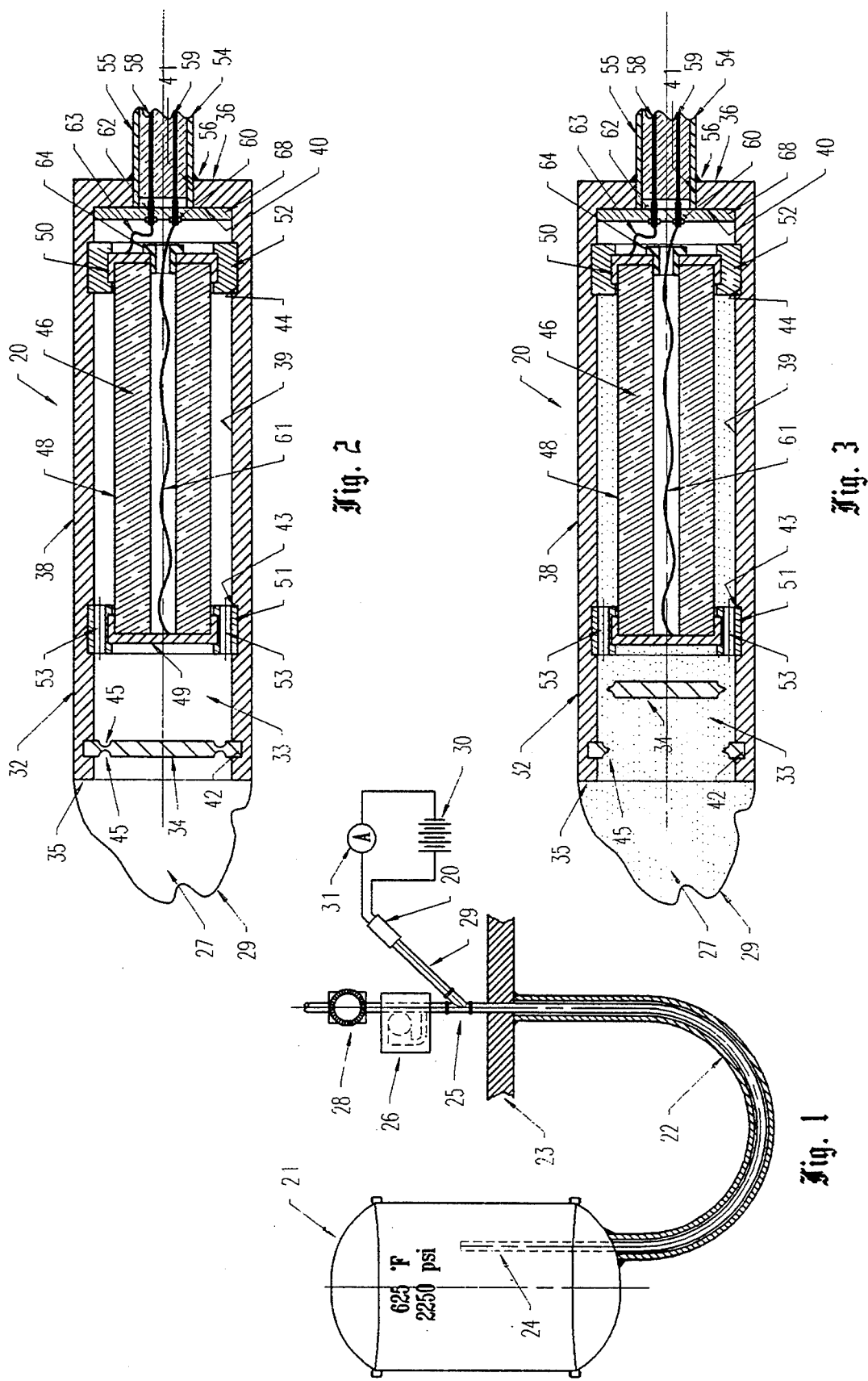

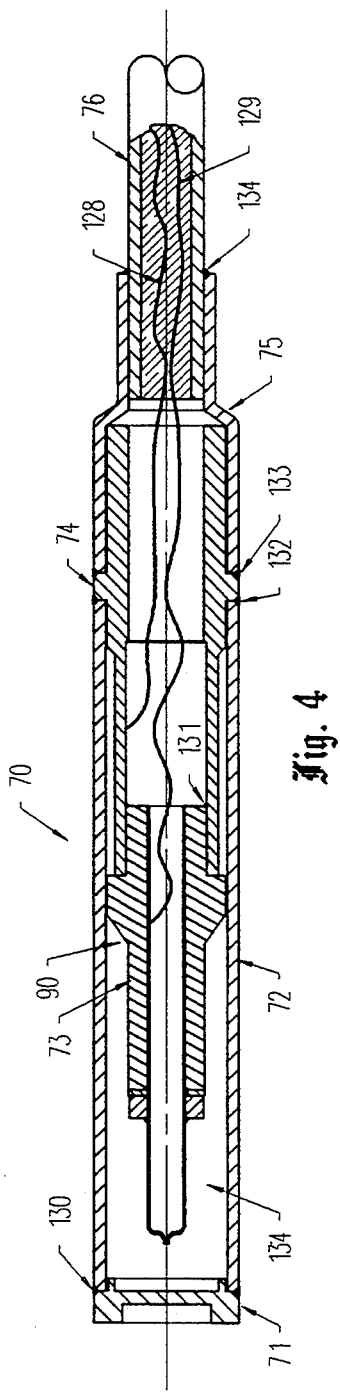
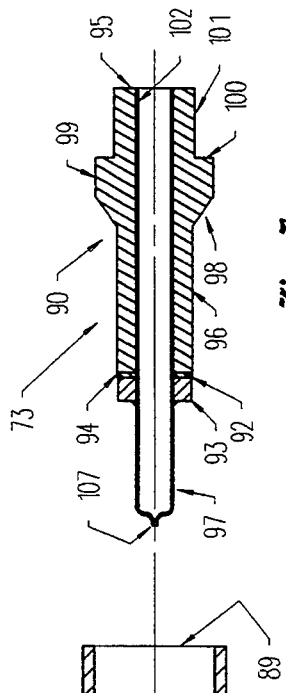
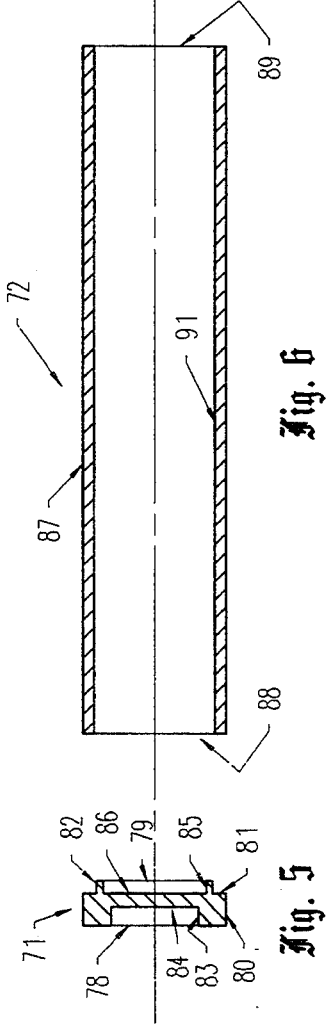
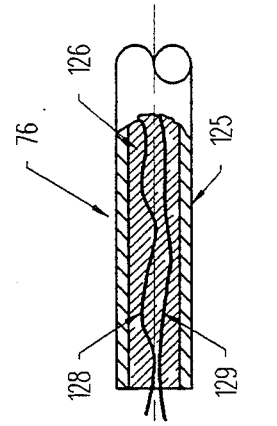
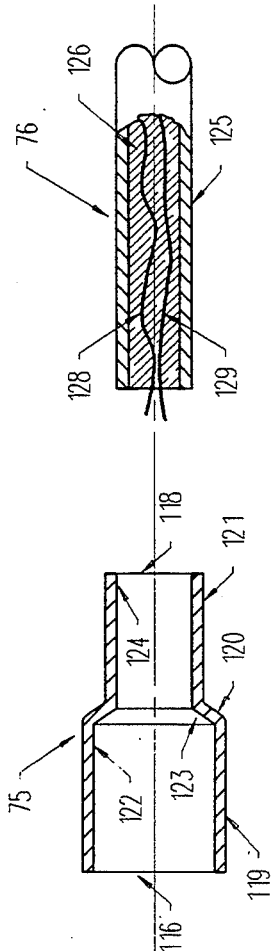
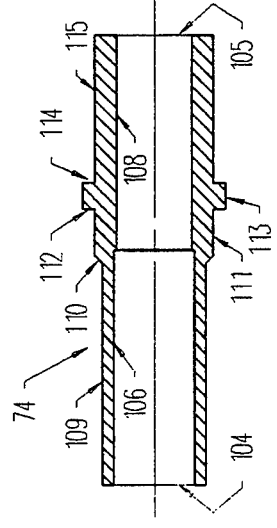

PRESSURE-SENSITIVE VARIABLE-RESISTANCE HYGROSCOPIC FLUID DETECTOR, AND METHOD

TECHNICAL FIELD

The present invention relates generally to the fields of fluid detectors and leak detectors, and, more particularly, to an improved pressure-sensitive variable-resistance detector for determining the presence or absence of a fluid and which is particularly useful in determining the fluid-tight scaled integrity of a thimble having a portion inserted into a pressurized water nuclear reactor.

BACKGROUND ART

A pressurized water nuclear reactor ("PWR") may contain water at about 625° F. at a pressure on the order of 2250 psi.

Current PWR reactor designs allow for the use of movable in-core detectors, fixed in-core detectors, or a combination of both, to enable three-dimensional mapping of the thermal neutron or gamma ray flux distribution within the reactor core. To this end, a number of casings or thimbles lead into the core to allow for insertion and removal of the detector assemblies. These casings are generally in the form of much-elongated closed-end tubes that are intended to sealingly separate hot pressurized water within the reactor from a normally-dry chamber or compartment within the casing. The pressure within the thimble is normally at ambient atmospheric pressure. By inserting the detectors into these casings or thimbles, a utility may map the thermal neutron density within the core, and make certain adjustments to cause the fuel to be consumed evenly. Utilities typically map their reactor cores on a monthly basis. One example of an in-core gamma-compensated neutron detector is shown and described in U.S. patent application Ser. No. 07/769,140 filed Sep. 30, 1991, and assigned to the assignee of the present application, the aggregate disclosure of which is hereby incorporated by reference.

Some reactors are now equipped with automatic shut-off valves to prevent the escape of water in the event of a thimble leak. Heretofore, the leaking thimble was detected by water reaching a transfer mechanism, which alerted the operators to close a manual isolation valve communicating with the thimble. Another method to determine a breach of the sealed integrity of a thimble was in terms of the driveability of a movable in-core detector during mapping. If the thimble had developed a leak, the automatic isolation valve would close, preventing the operator from inserting a detector into the pressurized water-containing thimble. The thimble was labeled inoperative if the force needed to insert an in-core detector exceeds a predetermined value. Unfortunately, since core mapping is typically performed at discrete time intervals, there was no advance warning that a thimble had previously ruptured.

Moreover, stagnant water entering a thimble through a breach in its wall, will corrode various portions and components of such detectors. Upon information and belief, it has heretofore not been possible to determine such thimble failure electrically until such time as failure of the component has occurred. This may be some time after the thimble has developed a breach.

It would, therefore, be generally desirable to provide a means or mechanism for determining and monitoring the fluid-tight sealed integrity of a casing or thimble such that corrective action may be taken or scheduled promptly after a leak occurs, as opposed to first discovering the leak upon an attempt to insert or remove a detector or after a failure of the detector.

It would also be generally desirable to know that a thimble has ruptured promptly upon the occurrence of such event.

DISCLOSURE OF THE INVENTION

The present invention provides a means and mechanism for determining the presence or absence of a particular fluid, such as water, within the thimble chamber or compartment promptly after the sealing integrity of the thimble has been compromised. However, this application is only illustrative, and is not intended to be restrictive of the scope of the appended claims unless an explicit limitation to that effect appears therein.

With parenthetical reference to the corresponding parts, portions or surfaces of the first disclosed embodiment illustrated in FIGS. 1–3, merely for purposes of illustration and not by way of limitation, the present invention, in one aspect, provides an improved fluid detector (20). The improved detector broadly includes an enclosure (32) having a chamber therewithin (33), this chamber containing a first fluid (e.g., dry nitrogen), the enclosure having a frangible wall portion (34) sealingly separating the first fluid within the chamber from a second chamber without (i.e., outside of) the chamber, the frangible portion being operatively arranged to burst or rupture when the pressure differential across the frangible portion exceeds a predetermined value (e.g., 100 psi) to permit the second fluid to enter the chamber; and a sensor (46) mounted within the chamber, the sensor having a portion (e.g., hygroscopic surface 48) exposed to the fluid within the chamber, the electrical resistance of the sensor portion having one value when the portion is exposed to the first fluid (e.g., dry nitrogen) and having another value when the sensor portion is exposed to the second fluid (e.g., water); whereby, when the pressure differential across the frangible portion is less than or equal to the predetermined value, the sensor portion will be exposed to the first fluid and the resistance of the sensor will be the first value, but when the pressure differential across the frangible portion is greater than the predetermined value, the frangible wall portion will burst or rupture to allow the second fluid to enter the chamber such that the sensor portion will be exposed to the second fluid and the resistance of the sensor will be the second value.

The invention may further include a detector for determining the electrical resistance of the sensor portion. This detector may include first and second electrodes (51,52) mounted on the sensor portion, a voltage source (30) for creating an electrical potential between the electrodes, and an ammeter (31) for determining the current flowing between the electrodes.

In another aspect, the invention provides an improved method for determining the presence of a fluid, which method broadly comprises the steps of: providing an enclosure (32) having a chamber (33) therewithin, the chamber containing a first fluid (e.g., dry nitrogen), the enclosure having a frangible wall portion (34) sealingly separating the first fluid within the chamber from a second fluid (e.g., water) without (i.e., outside) the chamber, the frangible wall portion being operatively arranged to burst or rupture when the pressure differential across the frangible portion exceeds a predetermined value (e.g., 100 psi) to permit the second fluid to enter the chamber; mounting a sensor (46) within the chamber, the sensor having a portion (48) exposed to the fluid within the chamber, the electrical resistance of the sensor being one value when the sensor portion is exposed to the first fluid and being another value when the sensor portion is exposed to the second fluid; exposing the outer surface of the frangible wall portion to the second fluid; causing the frangible wall portion to sealingly separate the first and second fluids when the pressure differential thereacross is less than or equal to the predetermined value; and causing the frangible wall portion to burst or rupture when the pressure differential thereacross is greater than the predetermined value; thereby to indicate the presence of the second fluid in the chamber. The invention preferably further includes the additional step of detecting the resistance of sensor.

While the invention is deemed to have particular utility in determining or monitoring the fluid-tight sealed integrity of a casing or thimble inserted into a pressurized water reactor, the invention is not limited to this in use. Indeed, the invention may be used broadly to indicate the presence or absence of a sensed fluid. In the disclosed embodiments, the sensor portion is a hygroscopic surface, the electrical resistance of which varies depending upon whether it is exposed to a wet or dry fluid. However, this is only one example of the sensor. Sensors responsive to disparities other than water may be substituted for such hygroscopic sensor. Accordingly, the word "fluid," as used herein, generically refers to a liquid or a gas, or a combination thereof, and is not necessarily limited to water.

Accordingly, the general object of the invention is to provide an improved fluid detector.

Another object is to provide an improved pressure-sensitive fluid detector.

Another object is to provide an improved method of detecting the presence or absence of a fluid.

Still another object is to provide an improved method of, and apparatus for, determining and/or monitoring the fluid-tight sealed integrity of a closed-end tubular casing or thimble having a portion inserted into a pressurized water reactor, in order that a leak in the casing or thimble may be detected at an early stage so that corrective action may be taken before leakage water corrodes other parts and components inserted into the thimble and causes them to fail.

These and other objects and advantages will become apparent from the foregoing and ongoing written specification, the drawings, and the appended claims.

BRIEF DESCRIPTION OF THE DRAWINGS

FIG. 1 is a schematic view of a pressurized water reactor, showing a U-shaped tubular casing or thimble as penetrating a seal deck floor and as having a distal end portion inserted into the reactor from its bottom, this view also showing the manual and automatic isolation valves, and further showing the improved fluid detector communicating with the interior of the thimble via a Y-connection.

FIG. 2 is an enlarged schematic fragmentary vertical longitudinal sectional view of the fluid detector shown in FIG. 1, this view depicting the enclosure, the frangible wall portion, the sensor operatively arranged within the chamber, this view also showing the frangible wall portion as normally sealing the chamber from the casing compartment.

FIG. 3 is a view similar to FIG. 2, but illustrates the frangible wall portion as having broken away such that water, represented by the dotted areas, within the thimble may enter the chamber so as to wet the outer hygroscopic surface of the sensor.

FIG. 4 is a fragmentary longitudinal vertical sectional view of a second form of the improved fluid detector.

FIG. 5 is a vertical longitudinal sectional view of the left end cap shown in FIG. 4, this left end cap having the frangible wall portion.

FIG. 6 is a vertical longitudinal sectional view of the outer casing shown in FIG. 4.

FIG. 7 is a vertical longitudinal sectional view of the subassembly shown in FIG. 4, which subassembly includes the sensor, a tubulation sealingly mounted therewithin, the brazed copper washer and the brazed ring.

FIG. 8 is a vertical longitudinal sectional view of the cable seal body shown in FIG. 4.

FIG. 9 is a vertical longitudinal sectional view of the cable adapter shown in FIG. 4.

FIG. 10 is a fragmentary vertical longitudinal sectional view of the metal-sheathed cable depicted in FIG. 4.

DESCRIPTION OF THE PREFERRED EMBODIMENT(S)

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. As used herein, the word "fluid" is intended to include a liquid (not necessarily water), a gas, or a combination thereof. Similarly, the word "dry" means non-aqueous (i.e., not containing water) and the word "wet" means aqueous (i.e., containing water).

The two embodiments disclosed herein will be described seriatim herebelow.

First Embodiment (FIGS. 1-3)

Referring now to the drawings, and, more particularly, to FIGS. 1-3 thereof, the present invention, in one aspect, provides an improved fluid detector, generally indicated at 20.

In FIG. 1, detector 20 is shown as being associated with a pressurized water nuclear reactor 21. This reactor, which is shown schematically in FIG. 1, contains hot pressurized water at a temperature of about 625° F. and at a pressure of about 2250 psi. A thimble 22, more generically a casing, is shown as sealingly penetrating a seal table deck 23, and as having a distal marginal end portion 24 penetrating the outer wall of the reactor and arranged therewithin. In the illustrated form, the thimble is shown as being inserted into the reactor from its bottom. In other designs, the thimble may be inserted through the top of the reactor. In any event, the thimble or casing, shown to be U-shaped in FIG. 1, is in the form of a much-elongated closed-end metal tube. The thimble is adapted to sealingly separate the heated pressurized water within the reactor from a normally-dry chamber or compartment within the tubular thimble or casing. A Y-fitting 25 is mounted on the thimble above the seal table deck. An automatic isolation valve 26 is positioned above fitting 25, and a manual isolation valve 28 is arranged above the automatic isolation valve 26. These valves may be selectively opened to permit suitable detectors and other apparatus to be inserted through the upper end of the thimble, and advanced or snaked therealong so as to be positioned within the reactor, and vice versa. The improved detector 20 is shown as communicating with the interior chamber or compartment, indicated at 27 in FIGS. 2 and 3, of the thimble via a conduit 29 communicating with the Y-fitting 25.

In the preferred embodiment, the improved detector is arranged to measure a change in the electrical resistance of at least a portion of the sensor, described infra, depending upon the presence or absence of water within the detector. More particularly, a voltage, represented by battery 30, is applied to the sensor, and the current flowing through the sensor is measured by an ammeter 31.

Referring now to FIG. 2, the sensor is schematically depicted as including an enclosure 32 having a chamber 33 therewithin. This chamber contains a first fluid, such as dry nitrogen. The enclosure has a frangible wall portion 34 sealingly separating the first fluid within the chamber from a second fluid without (i.e., outside) the chamber. This second fluid will normally be the fluid contained within the thimble or casing. As noted above, the thimble compartment is normally dry, and is substantially at ambient atmospheric pressure. However, should the thimble rupture, hot pressurized water may enter the thimble to act on the exposed face of frangible wall portion 34.

In the schematic form shown in FIG. 2, the enclosure is a horizontally-elongated rigid metal tube having an annular vertical left end face 35, an annular vertical right end face 36, and an outer cylindrical surface 38 extending therebetween. Enclosure 32 has an inwardly-facing horizontal cylindrical surface 39 extending rightwardly from the inner marginal end portion of left end face 35, a leftwardly-facing annular vertical surface 40, and an inwardly-facing horizontal cylindrical surface 41 continuing rightwardly therefrom to join the inner marginal end portion of right face 36. In the form shown, three axially-spaced annular grooves or recesses extend radially into the enclosure from its inner surface 39. From left-to-right in FIG. 2, these three recesses are indicated at 42, 43 and 44, respectively.

In this first form, the frangible wall portion 34 is depicted as being a circular disk-like member having its outer peripheral marginal end portion suitably received in left enclosure recess 42. The frangible wall portion is suitably sealed to the enclosure so that chamber 33 is normally hermetically sealed from the fluid within the thimble. As shown, a pair of opposed annular grooves, severally indicated at 45, extend into the thimble from its left and right end faces to provide an intermediate annular weakened portion which is adapted to rupture when the pressure differential across the frangible wall portion exceeds a predetermined minimum value. This minimum value may be about 100 psi. This value would therefore be greater than the normal pressure differential across the wall portion when the thimble contains atmospheric pressure, but would be less than the pressure differential which would exist if a break caused the pressure within the thimble to equalize within the reactor pressure.

An horizontally-elongated cylindrical tubular sensor, generally indicated at 46, is operatively arranged within chamber 33. Sensor 46 has annular vertical left and right end faces, a horizontal cylindrical inner surface, and a horizontal cylindrical outer surface 48. Sensor 46 may be formed of a suitable metalized ceramic which contains about 97.8% $Al_2O_3$. This material is hygroscopic such that its electrical resistance changes dramatically depending upon whether sensor outer surface 48 is wet or dry. The properties of the electrical resistance of the sensor portion is shown in the following table.

| Electrical Current of Sensor @ 15 volts DC | |
| --- | --- |
| Dry | Wet |
| $40 \times 10^{-12}$ amp | $8 \times 10^{-6}$ amp |

In other words, if battery 30 is arranged to apply a potential of about 15 volts DC between the first and second electrodes, the sensor, when exposed to a dry fluid within chamber 33, will produce a leakage current on the order of about $40 \times 10^{-12}$ amps. On the other hand, when the pressure differential across the frangible wall portion causes the frangible wall portion to rupture such that water within thimble 22 may enter chamber 33 and wet the hygroscopic sensor surface, the sensor will produce a leakage current on the order of $8 \times 10^{-6}$ amps. Thus, the electrical resistance of the sensor will vary by a factor of about 200,000 depending upon whether the sensor portion is exposed to a wet (i.e., aqueous) or dry (i.e., non-aqueous) fluid. This change in magnitude of the current may be sensed by ammeter 31, and used to indicate a breach in the thimble.

A first electrode, generally indicated at 49, is mounted on the left end of sensor 46. More particularly, this first electrode is in the form of a cup-shaped member having its circular vertical bottom surface engaging the left end face of the sensor, and as having an annular skirt portion engaging the left marginal end portion of sensor outer surface 48. A second electrode, generally indicated at 50, is mounted on the right marginal end portion of the sensor. This electrode is generally similar to left electrode 49, except that it is arranged as a mirror image of the first electrode. Moreover, the second electrode is provided with an axial horizontal through-hole to permit the passage of a conductor, as shown.

The electrode-sensor-electrode subassembly is operatively mounted on the enclosure within the chamber via axially-spaced first and second insulators 51, 52, respectively. Left Insulator 51 is shown as being a tubular member generated about a horizontal axis. The outer periphery of this electrode is received in enclosure second groove 43. A annular recess extends into the first insulator from its inner surface, to receive the outer peripheral surface of first electrode 49. Moreover, first insulator 51 is shown as being provided with a plurality of horizontal through-holes, severally indicated at 53, to permit fluid to pass freely through the first insulator to contact sensor outer surface 48.

The rightward second insulator 52 is substantially the same as the first insulator 51, except that through-holes 53 have been omitted. The outer periphery of second insulator 52 is received in third enclosure groove 44. An annular groove extends radially into the second insulator to receive the outer periphery of second electrode 50.

A metal-sheathed cable, generally indicated at 54, penetrates with the right end of the enclosure. More particularly, the outer metal sheath 55 of cable 54 is sealed to the enclosure by an annular weldment 56. Cable 54 contains conductors 58,59. These conductors penetrate a circular ceramic insulating plate 68 which has its circular vertical right end face arranged to abut enclosure annular surface 40. Conductor 59 is electrically connected via fitting 60 and insulated conductor 61 to first electrode 49. Second conductor 58 is connected via fitting 62 and insulated conductor 63 to second electrode 50. An insulating member 64 is operatively arranged in the axial through-hole of the second conductor to facilitate passage of conductor 61 therethrough. Cable 54 is shown schematically. In actual practice, a metal-sheathed coaxial cable may be employed.

As previously indicated, chamber 33 is normally filled with a dry fluid, such as gaseous nitrogen. Fluid within thimble 22 is exposed to the left or outer surface of frangible wall portion 34. This wall portion is designed to rupture or burst when the pressure differential thereacross exceeds a predetermined minimum value, say 100 psi. In the illustrated form, should a leak develop in the thimble, the pressurized water from the reactor will enter the thimble and be applied to the left face of frangible wall portion 34. In such event, the pressure differential across the frangible wall portion would then be much greater than the predetermined minimum value, and the frangible wall portion will rupture inwardly of the chamber, as shown in FIG. 3. However, in other applications, the chamber could be pressurized positively with respect to the environment such that the frangible wall portion would rupture outwardly if the pressure acting on the left face of the frangible wall portion were to fall dramatically.

Second Embodiment (FIGS. 4–10)

A second form of the improved fluid detector is generally indicated at 70 in FIG. 4. This second form is indicated as having a left end cap 71, an outer casing 72, a subassembly 73 including a metalized ceramic sensor 90, a cable seal body 74, a cable adapter 75, and a metal-sheathed cable 76.

As best shown in FIG. 5, the left end cap, which may be formed of 304 stainless steel or equivalent, is a specially-configured member generated about a horizontal axis. More particularly, the left cad cap has annular vertical left and right end faces 78,79, respectively. A stepped outer surface joins the outer margins of these left and right end faces. More particular, this outer surface includes a horizontal cylindrical surface 80 extending rightwardly from the outer margin of left end face 78, a rightwardly-facing annular vertical surface 81, and a horizontal cylindrical surface 82 continuing rightwardly therefrom to join the outer margin of right end face 79. Two opposed large-diameter blind recesses extend axially into the end cap from its end faces. The left recess is shown as being bounded by an inwardly-facing horizontal cylindrical surface 83 extending rightwardly from the inner margin of left end face 78, and by a leftwardly-facing circular vertical bottom surface 84. The right recess is shown as being bounded by an inwardly-facing horizontal cylindrical surface 85 extending leftwardly into the end cap from the inner margin of right end face 79, and by a rightwardly-facing circular vertical bottom surface 86. Recess bottom surfaces 84,86 define a weakened portion therebetween, which weakened portion is adapted to rupture or burst when the pressure differential thereacross exceeds a predetermined minimum value, again, say, 100 psi. Notice that annular grooves 45 have been omitted from the end cap shown in FIG. 5. The omission of these grooves is optional. Left end cap surfaces 82,79 and 85 define a rightwardly-extending tubular projection which is adapted to fit within the left marginal end portion of case 72.

As shown in FIG. 6, case 72 is a horizontally-elongated tubular member having annular vertical left and right end faces 88,89, respectively, an outer cylindrical surface 87, and an inner cylindrical surface 91. This case may also be formed of 304 stainless steel or equivalent.

Referring now to FIG. 7, subassembly 73 is shown as including sensor 90, tubulation 97, a braze washer 92, and a sealing ring 93. The sensor is shown as being a horizontally-elongated specially-configured tubular member having an annular vertical left end face 94, an annular vertical right end face 95, and an outer surface which sequentially includes a horizontal cylindrical surface 96 extending rightwardly from the outer margin of left end face 94, a leftwardly- and outwardly-facing frusto-conical surface 98, a horizontal cylindrical surface 99, a rightwardly-facing annular vertical surface 100, and a horizontal cylindrical surface 101 continuing rightwardly therefrom to join the outer margin of right end face 95. Sensor 90 has an axial through-bore bounded by inwardly-facing horizontal cylindrical surface 102. Sensor 90 may also be formed of a suitable metalized ceramic material.

Tubulation 97 is shown as being a horizontally-elongated thin-walled tube operatively arranged within the sensor through-bore. The left marginal end portion of this tubulation is pinched closed and sealed, as indicated at 107. Tube 97 may be formed of 304 stainless steel (hypaflex), or equivalent. The copper braze ring 92 is shown as being in the form of an annular flat-washer that surrounds tubulation 97 and abuts the left end face 94 of the sensor. Seal ring 93 is also shown as being in the form of an annular disk-like element which surrounds the tubulation and has its annular vertical right end face abutting the annular vertical left end face of braze ring 92. Seal ring 93 may be formed of a nickel-iron alloy, and is brazed to the tubulation. Braze ring 92 is brazed to the seal ring and to the sensor body.

Referring now to FIG. 8, the cable seal body is shown as being a horizontally-elongated specially-configured tubular member having annular vertical left and right end faces 104,105, respectively. Body 74, which may be conveniently formed of 304 stainless steel or equivalent, has a stepped axial through-bore which includes an inwardly-facing horizontal cylindrical surface 106 extending rightwardly from the inner margin of left end face 104, a leftwardly- and inwardly-facing frusto-conical surface, and a smaller-diameter inwardly-facing horizontal cylindrical surface 108 continuing rightwardly therefrom to join the inner margin of right end face 105. The outer surface of the cable seal body is also shown as being stepped, and includes a horizontal cylindrical surface 109 extending rightwardly from the outer margin of left end face 104, a leftwardly- and outwardly-facing frusto-conical surface 110, a horizontal cylindrical surface 111, a leftwardly-facing annular vertical surface 112, a horizontal cylindrical surface 113, a rightwardly-facing annular vertical surface 114, and a horizontal cylindrical surface 115 continuing rightwardly therefrom to join the outer margin of right end face 105.

Referring now to FIG. 9, the cable adapter 75 is shown as being in the form of a reducing nipple, and has annular vertical left and right end faces 116,118, respectively. The outer surface of member 75 includes a horizontal cylindrical surface 119 extending rightwardly from the outer margin of left end face 116, a rightwardly- and outwardly-facing frusto-conical surface 120, and a horizontal cylindrical surface 121 continuing rightwardly therefrom to join the outer margin of right end face 118. The stepped inner surface of member 75 includes a horizontal cylindrical surface 122 extending rightwardly from the inner margin of left end face 116, a leftwardly- and inwardly-facing frusto-conical surface 123, and a cylindrical surface 124 continuing rightwardly therefrom to join the inner margin of right end face 118. Cable adapter 75 may be formed of inconel-600 or equivalent.

Referring now to FIG. 10, the metal-sheathed conductor 76 is shown as being horizontally-elongated, and as having a thin-walled outer cylindrical metal sheath 125, preferably formed of inconel-600 or equivalent. A suitable insulation 126, such as magnesium oxide or aluminum oxide, is arranged within this sheath. The sheath conductor is shown as including two electrical conductors 128,129, respectively. The form of the sheathed cable is somewhat schematic. If desired, coaxial cable could be used.

Returning now to FIG. 4, the various parts depicted in FIGS. 5-10 are assembled as shown. The left end cap 71 is secured to the left marginal end portion of casing 72 by means of a peripheral laser weldment 130. Sensor-tubulation assembly 73 is mounted on the left end of cable seal body 74, and is sealed thereto by a peripheral braze 131. When so mounted, the sensor-tubulation subassembly and the left marginal end portion of the cable seal body are inserted into casing 72, and the joint between surfaces 112,89 is sealed by means of a peripheral laser weldment 132. The cable adapter 75 is then mounted on the right marginal end portion of cable seal adapter 74, and the joint between surfaces 114, 116 is sealed by means of a peripheral laser weldment 133. The left marginal end portion of sheathed cable 76 is inserted into the right marginal end portion of cable adapter 75, and the joint therebetween is sealed by means of a peripheral laser weldment 134. Conductor 129 is electrically connected to tubulation 97. Conductor 128 is electrically connected to cable seal body 74, as shown in FIG. 4.

The assembly thus formed defines a fluid detector having an assembled enclosure defining a chamber 134 therewithin. The sensor has a frangible wall portion, namely, the weakened portion between left end cap surfaces 84,86 which is adapted to burst or rupture when the pressure differential thereacross exceeds a predetermined minimum value. Chamber 134 normally contains a dry fluid, such as gaseous nitrogen or equivalent. The left surface of frangible wall portion 134 is adapted to communicate with the fluid within the thimble. Should the pressure of the fluid within the thimble increase, as by a breach or rupture of same, such that the pressure differential across the frangible wall portion exceeds the predetermined minimum value, the frangible wall portion will burst or rupture to allow the fluid to enter chamber 134 and wet the outer surface of sensor 90. Here again, this sensor portion may be a suitable metalized ceramic, as previously described. Tubulation 97 and braze ring 92 form the first electrode, and the cable seal adapter 74 forms the second electrode. Thus, water entering chamber 134 will wet the outer surface of sensor 90. This will cause a marked change in the electrical resistance of the sensor, which may be determined by means of an ammeter, as previously described.

Therefore, the invention provides an improved fluid detector which broadly includes an enclosure having a chamber therewithin, the chamber normally containing a first fluid, the enclosure having a frangible wall portion sealingly separating the first fluid within the chamber from a second fluid without the chamber, the frangible wall portion being operatively arranged to rupture or burst when the pressure differential thereacross exceeds a predetermined minimum value to permit the second fluid to enter the chamber, and a sensor arranged within the chamber, the sensor having a portion exposed to the fluid within the chamber, the electrical resistance of the sensor being one value when the sensor portion is exposed to the first fluid and being another value when the sensor portion is exposed to the second fluid; whereby, when the pressure differential across the frangible portion is less than or equal to the predetermined value, the sensor portion will be exposed to the first fluid and the resistance of the sensor will be a first value, but when the pressure differential across the frangible wall portion is greater than the predetermined value, the frangible wall portion will rupture or burst to allow second fluid to enter the chamber such that the sensor portion will be exposed to the second fluid and the resistance of the sensor will be its second value.

In use, the improved fluid detector performs the method of determining the presence of a fluid, which method broadly comprises the steps of: providing an enclosure having a chamber therewithin, the chamber containing a first fluid, the enclosure having a frangible wall portion sealingly separating the first fluid within the chamber from a second fluid without the chamber, the frangible portion being operatively arranged to burst when the pressure differential across the frangible portion exceeds a predetermined value to permit the second fluid to enter the chamber; mounting a sensor within the chamber, the sensor having a portion exposed to the fluid within the chamber, the electrical resistance of the sensor being one value when the portion is exposed to a first fluid and being another value when the portion is exposed to a second fluid; exposing the outer surface of the frangible wall portion to the second fluid; causing the frangible wall portion to sealingly separate the first and second fluids when the pressure differential thereacross is less than or equal to a predetermined value; and causing the frangible wall portion to burst when the pressure differential thereacross is greater than the predetermined value; thereby to indicate the presence of the second fluid in the chamber as a function of the electrical resistance of the sensor portion.

Modifications

The present invention contemplates that many changes and modifications may be made. For example, the two disclosed forms have been described as being so configured that the frangible wall portion will burst or rupture when the pressure differential thereacross exceeds 100 psi. This figure is merely illustrative, and may be readily changed or modified, as desired.

Similarly, in the preferred embodiments, the sensor portion has been described as being hygroscopic in the sense that its electrical resistance changes depending upon whether it is exposed to a dry fluid or a wet fluid. This too is for purposes of illustration. It is conceivable that the sensor portion could be insensitive to the presence of a first fluid but sensitive to the presence of a second fluid, independently of whether the second fluid contains water or not.

The structure of the sensor may be readily changed or modified, as desired. It is presently preferred that the first chamber be hermetically sealed in order that the second fluid will not leak into the first chamber to cause erroneous readings prior to a burst or rupture of the frangible portion. This is not, however, invariable.

While deemed particularly useful in determining and/or monitoring the sealed integrity of a thimble having a portion inserted into a pressurized water reactor, the invention broadly provides a fluid detector. Thus, the invention possesses utility apart from this illustrated end use.

Therefore, while two preferred forms of the improved fluid detector have been shown and described, and several modifications and changes thereof discussed, persons skilled in this art will readily appreciate that various additional changes and modifications may be made without departing from the spirit of the invention, as defined and differentiated by the following claims.

I claim:

1. A fluid detector, comprising:
   an enclosure having a chamber therewithin, said chamber containing a first fluid, said enclosure having a frangible portion sealingly separating said first fluid within said chamber from a second fluid without said chamber, said frangible portion being operatively arranged to rupture when the pressure differential across said frangible portion exceeds a predetermined value to permit said second fluid to enter said chamber; and
   a sensor arranged within said chamber, said sensor having a portion exposed to the fluid within said chamber, the electrical resistance of said sensor being one value when said sensor portion is exposed to said first fluid and being another value when said sensor portion is exposed to said second fluid;
   whereby, when the pressure differential across said frangible portion is less than or equal to said predetermined value, said sensor portion will be exposed to said first fluid and the resistance of said sensor will be said first value, but when the pressure differential across said frangible wall portion is greater than said predetermined value, said frangible wall portion will rupture to allow said second fluid to enter said chamber such that said sensor portion will be exposed to said second fluid and the resistance of said sensor will be said second value.

2. A fluid detector as set forth in claim 1 wherein said first fluid is non-aqueous, and said second fluid is aqueous.

3. A fluid detector as set forth in claim 2 wherein said first fluid is a gas.

4. A fluid detector as set forth in claim 3 wherein said first fluid is nitrogen.

5. A fluid detector as set forth in claim 1 wherein said second fluid is an aqueous gas.

6. A fluid detector as set forth in claim 1 wherein said second fluid is an aqueous liquid.

7. A fluid detector as set forth in claim 1 wherein said enclosure is relatively rigid such that the volume of said chamber is substantially unaffected by variations of said pressure differential below said predetermined value.

8. A fluid detector as set forth in claim 1 wherein, after said frangible portion has ruptured, the pressure of fluid in said chamber is permitted to equalize with the pressure of said second fluid.

9. A fluid detector as set forth in claim 1 wherein said sensor portion is a surface within said sensor.

10. A fluid detector as set forth in claim 1, and further comprising: a detector for determining the resistance of said sensor portion.

11. A fluid detector as set forth in claim 10 wherein said detector includes spaced first and second electrodes mounted on said sensor portion, a voltage source for creating an electrical potential between said electrodes, and an ammeter for determining the current flowing between said electrodes.

12. A fluid detector as set forth in claim 1, and further comprising: a closed-end tubular casing having a portion inserted into the core of a pressurized water reactor casing, said portion having an outer surface exposed to the water within said reactor and having an inner surface facing into a compartment, and wherein said second fluid is arranged in said compartment within said casing such that the resistance of said sensor will indicate the fluid-tight sealed integrity of said casing.

13. The method of determining the presence of a fluid, comprising the steps
   providing an enclosure having a chamber therewithin, said chamber containing a first fluid, said enclosure having a frangible portion sealingly separating said first fluid within said chamber from a second fluid without said chamber, said frangible portion being operatively arranged to burst when the pressure differential across said frangible portion exceeds a predetermined value to permit said second fluid to enter said chamber;
   mounting a sensor within said chamber, said sensor having a portion exposed to the fluid within said chamber, the electrical resistance of said sensor being one value when said portion is exposed to said first fluid and being another value when said portion is exposed to said second fluid;
   exposing the outer surface of said frangible wall portion to said second fluid;
   causing said frangible portion to sealingly separate said first and second fluids when the pressure differential thereacross is less than or equal to said predetermined value; and
   causing said frangible wall portion to burst when the pressure differential thereacross is greater than said predetermined value;
   thereby to indicate the presence of said second fluid in said chamber.

14. The method of monitoring the fluid-tight sealed integrity of a casing having a portion inserted into a pressurized water reactor, said casing normally separating water within said reactor from a compartment within said casing, said compartment being normally filled with a fluid, comprising the steps of:

mounting an enclosure having a chamber therewithin, in fluid communication with said compartment;

mounting a frangible wall portion between said compartment and chamber so as to sealingly separate the same;

mounting a sensor within said chamber, said sensor having a portion exposed to the fluid within said chamber, the electrical resistance of said sensor being one value when said portion is exposed to said first fluid and another value when said portion is exposed to a second fluid;

causing said frangible wall portion to sealingly separate said chamber and compartment when the pressure differential across said frangible wall portion is less than or equal to a predetermined minimum value;

causing said frangible wall portion to burst when the pressure differential thereacross exceeds said predetermined value to allow said second fluid to enter said chamber:

thereby to indicate a breach of the fluid-tight sealed integrity of said casing as a function of the resistance of said sensor.

15. The method set forth in claim 14, and further comprising the additional step of:

detecting the resistance of said sensor.

* * * * *